Figure 1:
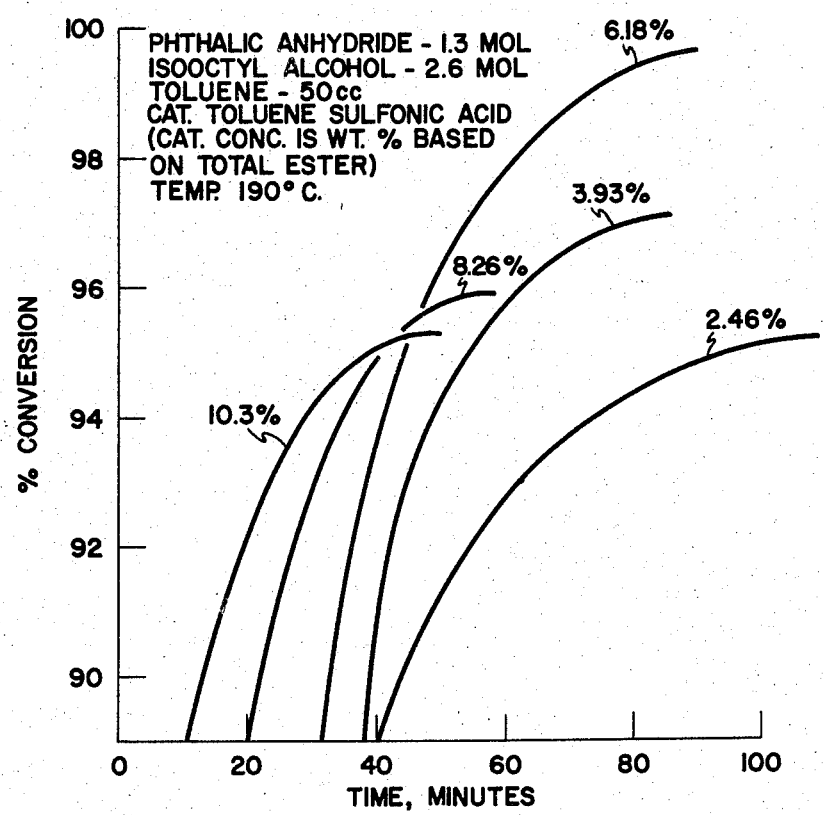

EFFECT OF CATALYST
CONCENTRATION ON % CONVERSION

2,883,416

ESTERIFICATION OF DICARBOXYLIC ACIDS WITH STOICHIOMETRIC QUANTITIES OF HIGHER ALIPHATIC ALCOHOLS

Alan A. Schetelich, Cranford, and Joseph L. Betts, Jr., Westfield, N.J., assignors to Esso Research and Engineering Company, a corporation of Delaware Application October 31, 1956, Serial No. 619,462

10 Claims. (Cl. 260—475)

This invention relates to an improvement in the method of esterifying synthetic branched chain alcohols. More particularly this invention relates to improved methods of esterifying synthetic branched chain alcohols of the $C_7$ to $C_{13}$ range by employing reactants, conditions and catalyst concentrations in certain critical combinations to prepare plasticizer esters of high quality.

The ever expanding use of plastic materials such as vinyl chloride polymers or copolymers, polyvinyl acetate, cellulose esters, acrylate and methacrylate resins, rubbers such as the emulsion copolymers of butadiene with styrene or acrylonitrile, or the copolymers of isobutylene with small amounts of a diolefin such as isoprene, have created a large demand for suitable plasticizers. Branched chain alkyl organic acid esters and particularly alkyl phthalic acid esters and more particularly isooctyl and isodecyl phthalate have been known to be extremely satisfactory plasticizers for the aforementioned high molecular weight materials.

Since the advent of the now well-known oxo alcohol synthesis, it has been found that the branched chain alcohols, and especially isooctyl alcohol, are extremely desirable for the preparation of plasticizer esters in particular of the phthalate type.

The oxo synthesis is of course understood in the art as referring to a process wherein an olefin feed is first reacted or oxonated with carbon monoxide and hydrogen at a temperature in the range of about 100° to 220° C. and under a pressure of about 1500 to 6000 p.s.i.g. in the presence of a cobalt catalyst to form aldehydes in accordance with the following reaction:

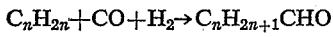

$$C_nH_{2n}+CO+H_2 \rightarrow C_nH_{2n+1}CHO$$

and the aldehydes are then catalytically hydrogenated to form the desired alcohols as follows:

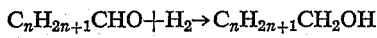

$$C_nH_{2n+1}CHO+H_2 \rightarrow C_nH_{2n+1}CH_2OH$$

The art and literature abounds with various specific oxo catalysts and hydrogenation catalysts which may be employed. So far as the oxo catalyst is concerned, it is generally preferable to employ an oil-soluble cobalt salt such as cobalt oleate, stearate and the like. However, other cobalt catalysts are known to be effective for this synthesis. They include metallic cobalt, cobalt oxide, cobalt acetate, cobalt formate and many other cobalt compounds. Subsequent to the oxonation reaction and prior to the hydrogenation of the aldehyde, the cobalt catalyst is conventionally removed by any one of various known means. Among the most popular means of decobalting the aldehyde product are thermal treatment and treatment of the cobalt contaminated product with an acid to form the cobalt salt which is removed as such. In thermal decobalting the cobalt carbonyl is generally decomposed and thus removed.

The hydrogenation of the decobalted oxo aldehyde product may be carried out in the presence of known hydrogenation catalysts such as supported or unsupported metallic nickel, cobalt, or sulfactive catalysts such as tungsten, molybdenum and nickel sulfides, alone or in combination with copper chromites or other carbonyl group reducing catalysts. In the hydrogenation step, the temperatures are generally between the range of 65° to 235° C. and pressures within the range of about 100 to 300 atmospheres.

Olefins suitable as oxo feed stocks may be obtained from any of numerous sources. Of particular commercial interest are the $C_7$–$C_9$ olefins obtained by the U.O.P. polymerization process wherein a $C_3$–$C_4$ olefin feed is polymerized at temperatures between about 175° and 300° C. and at pressures between about 25 to 50 atmospheres over a phosphoric acid catalyst generally absorbed on a carrier such as silica and the like. Of late, it has also been found that suitable olefin feeds may be obtained from steam cracking processes if the steam cracked fraction is subsequently treated to remove deleterious material such as conjugated diolefins and cyclic dienes. A typical composition of oxo alcohols obtained by oxonating a U.O.P. $C_7$ olefin cut is the following $C_8$ alcohol composition which comprises:

25 to 40% of 2-methyl-3-ethyl pentanol-1 and 2-isopropyl pentanol-1
15 to 25% of 2-isopropyl-3-methyl butanol-1
5 to 10% of 2,5-dimethyl hexanol-1
5 to 10% of 3,4-dimethyl hexanol-1
5 to 10% of 3,4,4-trimethyl pentanol-1

It is emphasized however that the above composition is only exemplary of a large number of various compositions which are suitable for the preparation of the present plasticizers.

Two methods of esterification have been previously employed to ultimately produce the desired plasticizers. In one of these methods known as the high temperature process, the acid or acid anhydride such as phthalic anhydride, is mixed with a substantial excess of alcohol and heated to speed the reaction and to remove the water of esterification. Heating is continued until esterification is substantially completed. The total reaction mixture is either topped or stripped to remove the lower boiling constituents and the ester product may be used as such or may be further distilled preferably under vacuum. The ester made by the aforesaid process is generally not a commercially acceptable product in that the color is dark due to the product having been subjected to high thermal conditions.

A second method of esterification involves the use of smaller excesses of alcohol but produces the esterification in the presence of an acid catalyst and usually by the addition of a third component in order to act as an entrainer or as an azeotrope former for the removal of water at a lower temperature.

Typical acid catalysts which may be employed in this process are sulfuric acid, the aromatic sulfonic acids such as benzene sulfonic acid, toluene sulfonic acid, naphthalene sulfonic acid and the like. Entrainers or azeotrope formers include the low boiling aromatics such as benzene, toluene, xylene and the like, paraffinic hydrocarbons of suitable boiling point, e.g. heptane and octane, either normal or branched, or olefinic materials such as diisobutylene, a copolymer of isobutylene and n-butylene known commercially as codimer, etc.

Acidic reactants which may be employed in the preparation of the preferred esters include the organic dicarboxylic acids or anhydrides containing generally from 4 to 12 carbon atoms per molecule. Typical of these ester forming acids or anhydrides are phthalic, adipic, azelaic and sebacic. The alcohol component is preferably derived via the oxo process aforementioned and should contain from about 7 to 13 carbon atoms per molecule. These alcohols will herein be referred to as oxo alcohols to designate mixtures of various branched alcohols. The more prominent oxo alcohols which may be employed are octyl, decyl and tridecyl.

Although the second named esterification process is by far the more commercially acceptable of the two, there are still many facets of the process which leave much to be desired. In these prior art processes, it was found necessary to employ excess alcohol, that is, >10 wt. percent more than two moles of alcohol per mole of phthalic anhydride or acid in order to effect reasonably high conversion levels and the preparation of esters of high quality. The necessity of employing excess alcohols has posed many problems. The excess alcohol which has not been reacted during the esterification process is to some extent contaminated by the reaction, yet the cost of these alcohols prohibits the manufacturer of these phthalate esters from discarding them or employing them for less lucrative purposes. Thus it is common practice in the commercial manufacture of phthalate and the like esters to recycle the aforesaid unused excess alcohol to the initial reaction. As a result of this recycle alcohol substantial amounts of contaminants are introduced into the reaction mixture and the overall ester quality is low as compared to an ester prepared without the use of such recycle alcohol.

Beside the poor quality ester resulting from the use of excess alcohol and recycling there are other major disadvantages to the prior art processes. The use of excess alcohol of course decreases the active charge capacity of the reactor. Also the time and heat required for stripping the finished product are substantially increased with increased amounts of excess alcohol.

It is therefore a primary object of this invention to set forth a process of esterifying phthalic or other acids and anhydrides in a manner which will preferably permit the use of stoichiometric amounts of alcohol and whereby the use of excess alcohol is minimized or eliminated. It is a further object of this invention to produce esters of high quality and good color at high conversion rates.

Attempts to employ substantially stoichiometric amounts of alcohol and acid or anhydride under conventional operating conditions have led to not only extremely low reaction rates and low conversion levels but also crude ester products having a mediocre ester color, e.g. >20 APHA. APHA signifies "American Public Health Association." It is a color scale developed to determine water purity and is the same as Hazen color. 10 APHA is water white. It has been found that the use of high temperatures and short reaction times is much more satisfactory for the preparation of good color quality esters than lower temperatures and longer reaction times.

To show the effect of temperature and reaction time on the ester color several reactions were carried out as indicated by the following table.

TABLE I

*Effect of temperature*

2.2 moles of isooctyl alcohol
1.0 mole of phthalic anhydride
1.78 wt. percent p-toluene sulfonic acid (based on phthalic anhydride)
50 cc. toluene

| Temp., °C. | Time for Indicated Conversion (Min.) | | | Color (APHA) |
| --- | --- | --- | --- | --- |
| | 95% | 97% | 99% | |
| 120 | 200 | 240 | 287 | 100 |
| 134 | 120 | 150 | | 80 |
| 150 | 63 | 78 | 105 | 15 |
| 183 | 40 | 52 | | 10 |

From the above it is apparent that high temperatures, e.g. 150° to 200° C., are not only advantageous from the standpoint of good ester color but there is a substantial increase in the reaction rate.

The following table shows the effect of catalyst concentration:

TABLE II 2.2 moles isooctyl alcohol
1.0 mole phthalic anhydride
Catalyst: p-toluene sulfonic acid
Temperature: 165° C.
50 cc. toluene

| Catalyst Conc. Wt. percent (Based on total ester) | Conversion (Minutes for)— | |
| --- | --- | --- |
| | 100% | 98% |
| 0 | >500 | >500 |
| 1.40 | 270 | 105 |
| 2.79 | 110 | 32 |
| 4.14 | 85 | 18 |
| 7.25 | 60 | 7 |

In the above example 10% excess alcohol was employed and the results indicate a continual increase in rate with an increase in catalyst. However the 10% excess alcohol in this example was degraded and if recycled would result in poor quality ester product.

A remarkably different effect is achieved with increased catalyst concentration by maintaining the reactants in stoichiometric amounts or less than 5% excess alcohol as indicated by Figure 1 of the drawing which plots percent conversion against time.

It is readily seen from Figure 1 that there is a critical range of catalyst concentration, i.e. about 4–8 wt. percent. Using high catalyst concentration, e.g. 10%, 94–95% conversion is rapid; however, the curve sharply flattens at about 95% conversion so that for desired 96–100% conversions this catalyst concentration with stoichiometric quantities of reactants is in a practical sense inoperative. Similarly concentrations below about 4 wt. percent require extremely long reaction times to even reach the minimum desired conversion of about 96%.

Figure 2:
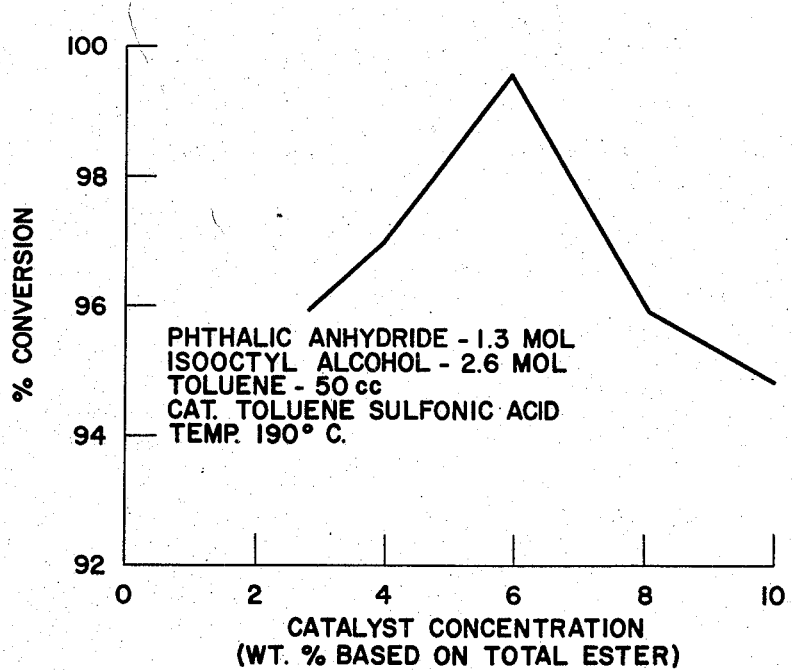

Figure 2 is a chart plotting catalyst concentration against percent conversion which further illustrates the criticality of the catalyst concentration when reacting the alcohol and acid or anhydride in stoichiometric amounts.

As previously noted, the alcohol reactant is, under reaction conditions, subject to degradation by oxidation or other means whereupon ester color is adversely affected, especially in the presence of acid catalyst. The high temperature, short contact time method employed herein substantially reduces this degradation; however, in many cases it will be desirable to further reduce the tendencies of oxidation by carrying out the reaction in an oxygen-free atmosphere, i.e. in the presence of an inert gas. It is therefore preferred to carry out this reaction in a reactor which has been swept free of air by such an inert gas as $CO_2$. Also during the heating up and cooling down periods a small positive pressure of $CO_2$ should be maintained in the reactor.

After the crude ester is formed various finishing techniques may be employed. A typical finishing treatment is as follows: The crude ester is first neutralized with aqueous caustic at elevated temperatures, hot water washed and vacuum steam distilled to top off water, toluene.

To more fully understand the present invention reference should now be had to the examples which follow:

EXAMPLE 1

Two moles of oxo isooctyl alcohol, one mole of phthalic anhydride, 3.2 wt. percent (based on reactants)

toluene and 6.2 wt. percent (on theoretical ester) of p-toluene sulfonic acid were mixed in a reactor. The reactor was then flushed with $CO_2$ and the reaction mixture heated to an end temperature of 190° C. for 100 minutes. A 99.5% conversion was reached as indicated by titrating the remaining unreacted phthalic acid with caustic. The crude ester was then washed twice with one-third its volume of 5% hot caustic, then with hot water. The product was then vacuum distilled to remove entrainer and water. The final product had an ester color of 10 APHA which is water white, a premium grade product.

The example above shows the use of stoichiometric quantities of reactants. Small excesses of alcohol, not more than 5 wt. percent excess, may be used in which case it is preferable to operate in the lower temperature ranges, i.e. 150° to 170° C., and catalyst concentration, i.e. 4–6 wt. percent.

EXAMPLE 2

One mole of phthalic anhydride and two moles of oxo decyl alcohol (no excess), 7.4 wt. percent (based on reactants) toluene and 6.1 wt. percent (based on theoretical ester) of p-toluene sulfonic acid were mixed in a reactor and reacted under an inert atmosphere ($CO_2$) for 110 minutes to an end temperature of 185° C. A 97.5% conversion was obtained. The final ester color was 15 APHA.

EXAMPLE 3

One mole of azelaic acid and two moles of oxo isooctyl alcohol (no excess), 7.68 wt. percent (based on reactants) toluene and 4.9 wt. percent (based on theoretical ester) of p-toluene sulfonic acid were mixed in a reactor and reacted under an inert atmosphere ($CO_2$) for 150 minutes to an end temperature of 170° C. A 99.1% conversion was obtained.

EXAMPLE 4

One mole of adipic acid and two moles of oxo isooctyl alcohol (no excess), 8.5 wt. percent (based on reactants) toluene and 6.0 wt. percent (based on theoretical ester) of p-toluene sulfonic acid were mixed in a reactor and reacted under an inert atmosphere ($CO_2$) for 200 minutes to an end temperature of 170° C. A final conversion of 97% was obtained. Final ester color was 10 APHA.

What is claimed is:

1. A method of preparing plasticizer esters which comprises reacting in the presence of a hydrocarbon entrainer a $C_7$–$C_{13}$ alcohol obtained by oxonating a $C_6$–$C_{12}$ olefin with a compound having from 4–12 carbon atoms selected from the group consisting of dicarboxylic acids and dicarboxylic acid anhydrides, said alcohol being present in substantially stoichiometric quantities in the presence of from 4 to 8 wt. percent based on total ester of an aromatic sulfonic acid esterification catalyst at a temperature within the range of 150° to 200° C. for a time sufficient to effect at least a 96% conversion.

2. A method in accordance with claim 1 wherein the acid esterification catalyst is toluene sulfonic acid.

3. A method in accordance with claim 1 wherein said temperature is from 150° to 170° C.

4. A method of preparing esters which comprises reacting in the presence of a hydrocarbon entrainer an isooctyl alcohol obtained by oxonating a $C_7$ olefin with a compound having from 4–12 carbon atoms selected from the group consisting of dicarboxylic acids and dicarboxylic acid anhydrides, said isooctyl alcohol being present in substantially stoichiometric amounts in the presence of from 4–8 wt. percent based on total ester of an aromatic sulfonic acid esterification catalyst, at a temperature within the range of 150° to 200° C. and in an oxygen-free atmosphere for a time sufficient to effect at least a 96% conversion.

5. A method in accordance with claim 4 wherein the acid esterification catalyst is toluene sulfonic acid.

6. A method in accordance with claim 4 wherein said temperature is from 150° to 170° C.

7. A method of preparing diisooctyl phthalates of good quality which comprises reacting in the presence of a hydrocarbon entrainer isooctyl alcohol obtained by oxonating a $C_7$ olefin with an acidic compound selected from the group consisting of phthalic acid and phthalic anhydride, said alcohol being present in substantially stoichiometric quantities in the presence of from 4–8 wt. percent based on the total phthalate ester of an organic sulfonic acid at a temperature within the range of 150° to 200° C. and in an oxygen-free atmosphere for a time sufficient to effect at least a 96% conversion.

8. A method in accordance with claim 7 wherein the acid esterification catalyst is toluene sulfonic acid.

9. A method in accordance with claim 7 wherein said temperature is from 150° to 170° C.

10. A method in accordance with claim 7 wherein said reaction is carried out in the presence of carbon dioxide to minimize oxidation.

References Cited in the file of this patent

UNITED STATES PATENTS

| | | |
|---|---|---|
| 1,764,022 | Jaeger | June 17, 1930 |
| 2,499,848 | Catlin et al. | Mar. 7, 1950 |
| 2,628,249 | Bruno | Feb. 10, 1953 |
| 2,776,985 | McKinnis | Jan. 8, 1957 |
| 2,780,643 | Buchner | Feb. 5, 1957 |